(12) United States Patent
Hume

(10) Patent No.: US 8,516,737 B2
(45) Date of Patent: Aug. 27, 2013

(54) COVERABLE FISH NET APPARATUS

(71) Applicant: Daniel R. Hume, Ingersoll (CA)

(72) Inventor: Daniel R. Hume, Ingersoll (CA)

(*) Notice: Subject to any disclaimer, the term of this patent is extended or adjusted under 35 U.S.C. 154(b) by 0 days.

(21) Appl. No.: 13/712,667

(22) Filed: Dec. 12, 2012

(65) Prior Publication Data
US 2013/0097913 A1 Apr. 25, 2013

Related U.S. Application Data

(63) Continuation-in-part of application No. 12/983,662, filed on Jan. 3, 2011, now Pat. No. 8,356,443.

(51) Int. Cl.
*A01K 77/00* (2006.01)
(52) U.S. Cl.
USPC .............................................. 43/11
(58) Field of Classification Search
USPC ............... 43/10–12; D22/135; 119/161; 294/1.3–1.5; 15/257.6; 135/33.2
See application file for complete search history.

(56) References Cited

U.S. PATENT DOCUMENTS

| 609,160 | A | * | 8/1898 | McWithey | 99/323.5 |
| 4,272,906 | A | | 6/1981 | Liebling | |
| 5,276,989 | A | | 1/1994 | Lumb et al. | |
| 5,822,908 | A | * | 10/1998 | Blanchard | 43/11 |
| D489,789 | S | | 5/2004 | Helms | |
| 7,124,533 | B2 | | 10/2006 | Kleckner | |
| 7,644,532 | B2 | * | 1/2010 | Capio | 43/11 |
| 2010/0013251 | A1 | * | 1/2010 | Yang | 294/1.3 |

* cited by examiner

*Primary Examiner* — Kimberly Berona

(57) ABSTRACT

The coverable fish net apparatus provides for easily netting a fish and selectively covering a first frame with a large net and a second frame with small net. A strap is disposed on a second end of the first frame and a clip is disposed on an outer end thereof. The second frame is slideably positioned on the handle via a lock mechanism including positions partially over and completely over the first frame toy trap a fish within. A strap is disposed on the second end and a clip is disposed on an outer end thereof. A hook is pivotally disposed on an apex of the second frame. Effectively netting, and revival prior to release, of varying sizes of fish is thereby best accomplished, with less chance of fish escape.

4 Claims, 8 Drawing Sheets with reference now to the drawings, and in particular

COVERABLE FISH NET APPARATUS

I claim benefit of my U.S. Utility application Ser. No. 12/983,662 filed on Jan. 3, 2011.

BACKGROUND OF THE INVENTION

Difficulties are often encountered in netting and retaining a fish within a net. The present apparatus provides unique solutions to this problem as well as for assisting in fish revival.

FIELD OF THE INVENTION

The coverable fish net apparatus relates to fish nets and more particularly to a fish net with slideably positioned and lockable second frame with small net above a first frame with a lower large net, a strap disposed on a second end of the apparatus, a clip disposed on an outer end of the strap, and a hook disposed on an apex of the second frame.

SUMMARY OF THE INVENTION

The general purpose of the coverable fish net apparatus, described subsequently in greater detail, is to provide a coverable fish net apparatus which has many novel features that result in an improved coverable fish net apparatus which is not anticipated, rendered obvious, suggested, or even implied by prior art, either alone or in combination thereof.

To attain this, the coverable fish net apparatus provides for easily netting a fish and selectively covering the first frame and large net with the second frame with small net. The second frame with small net is slideably positioned in a plurality of positions along the handle, with the second frame being capable of positioning on the handle well above the first frame and progressively positioned closer to the first frame. The second frame may further be positioned partially over the first frame, and completely over the first frame, thereby trapping a fish within. Release of the lever positions the second frame with small net as chosen. A strap is disposed on a second end of the apparatus and a clip is disposed on an outer end of the strap. A hook is pivotally disposed on an apex of the second frame. Effectively netting a plurality of sizes of fish is thereby best accomplished, with less chance of fish escape.

Of importance is that the first and second frames may be provided in identical shapes, including a planar egg shape. In positioning the handle vertically in water, the nets and frames are then best positioned, with large egg portion downwardly, to enable the revival of fish, prior to release for example. The shape thereby effectively avoids fish fin entanglement.

Importantly, the frames and the handle may be provided in rigid materials to aid in slideable sleeve operation and in full proof function. The frames and handle may further be provided in rectangular stock of metal, alloys, composites, plastics, and other appropriate materials in order to further enhance strength and integrity.

Thus has been broadly outlined the more important features of the improved coverable fish net apparatus so that the detailed description thereof that follows may be better understood and in order that the present contribution to the art may be better appreciated.

These together with additional objects, features and advantages of the improved coverable fish net apparatus will be readily apparent to those of ordinary skill in the art upon reading the following detailed description of presently preferred, but nonetheless illustrative, embodiments of the improved coverable fish net apparatus when taken in conjunction with the accompanying drawings.

DETAILED DESCRIPTION OF THE DRAWINGS

Figure 1:
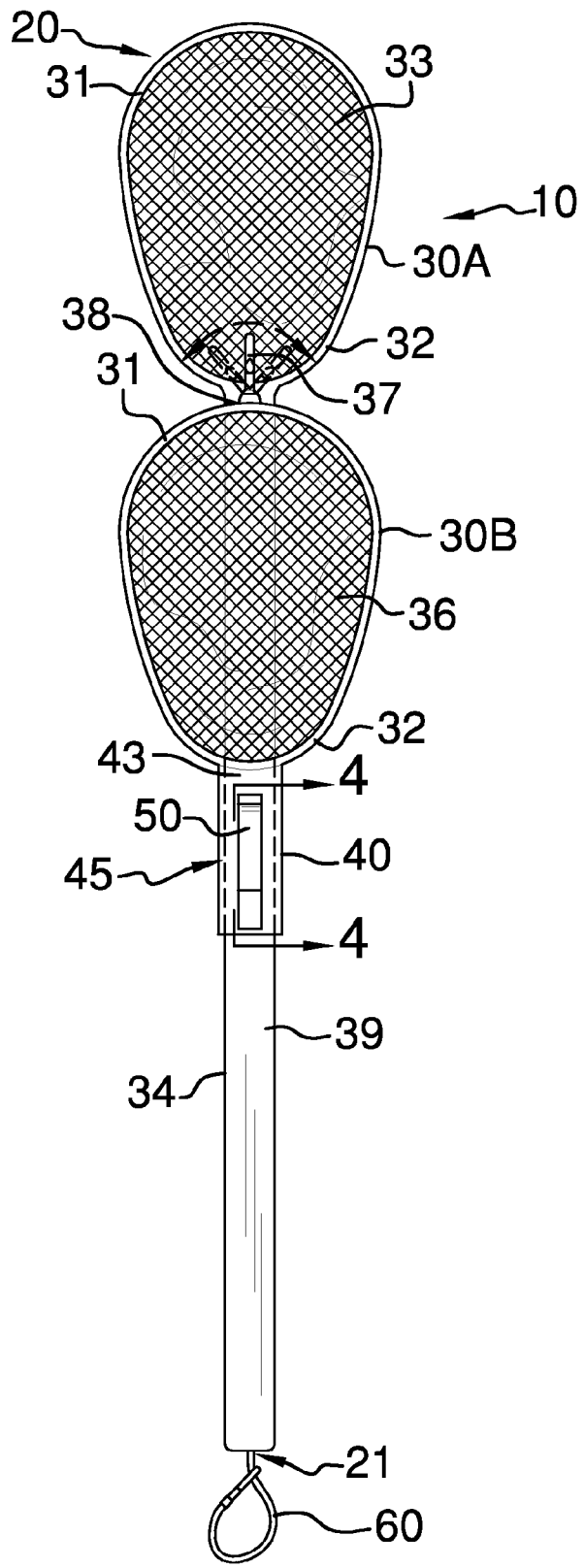
FIG. 1 is a top plan view.
Figure 2:
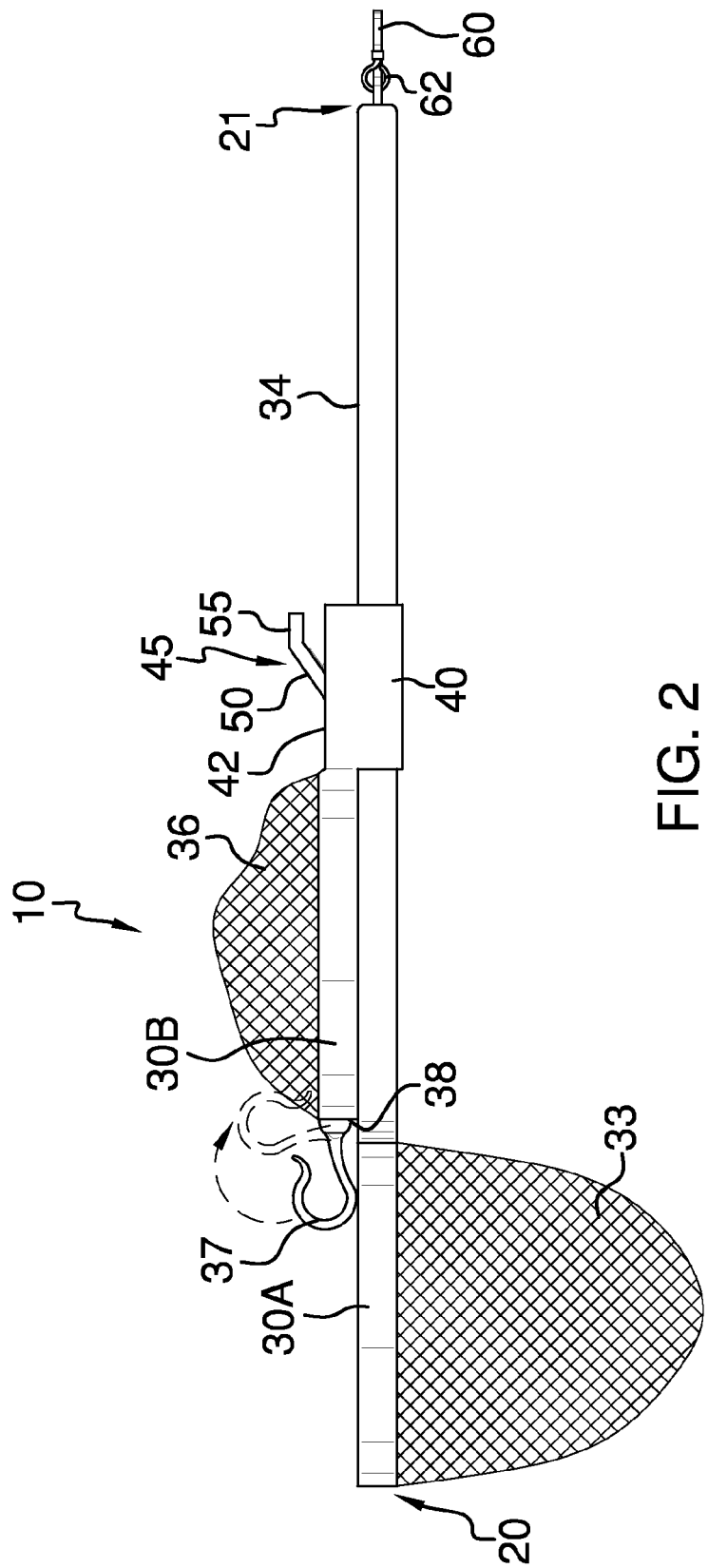
FIG. 2 is a lateral elevation view with a small net positioned away from a large net.
Figure 3:
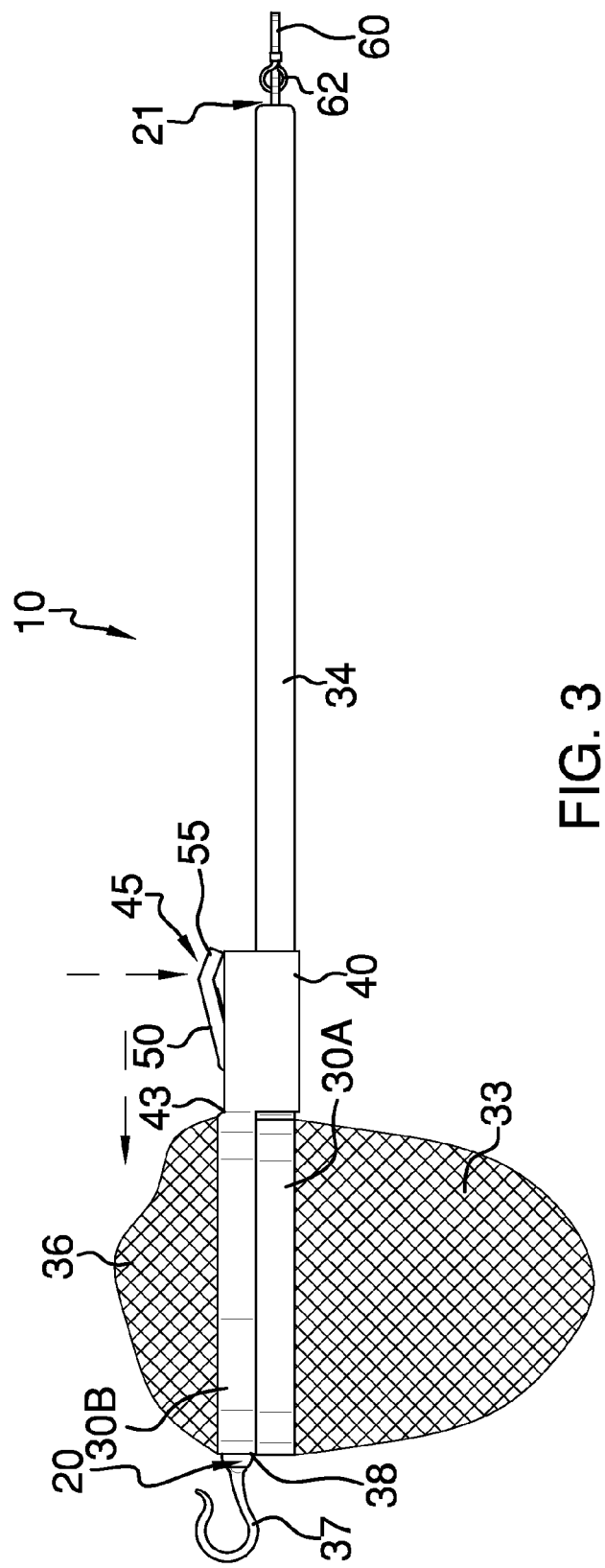
FIG. 3 is a lateral elevation view showing the small net attached to a second frame positioned atop the large net attached to a first frame.

With reference now to the drawings, and in particular FIGS. 1 through 8 thereof, the principles and concepts of the coverable fish net apparatus generally designated by the reference number 10 will be described.

The apparatus 10 partially comprises a first end 20 spaced apart from a second end 21. A planar egg shaped rigid first frame 30A is disposed at the first end 20. A large portion 31 of the first frame 30A is disposed distally. A small portion 32 is spaced apart from the large portion 31. A large net 33 is flexibly suspended from the first frame 30A.

A rigid handle 34 is inflexibly extended from the first frame 30A small portion 32 to the second end 21. At least one semicircular detent 35 is centrally disposed on a top side 39 of the handle 34.

A sleeve 40 is slideably disposed around the handle 34. An opening 41 is centrally disposed within the sleeve 40 from an upper side 42 thereof to the top side 39 of the handle 34. A strap 60 is disposed on the second end 21. A quick-release clip 62 is disposed on an outer end 64 of the strap 60. The strap 60 is configured to engage a securement member, such as a belt loop, of a user's clothing to support the handle 34 and the first and second frames 30A, 30B during use to net a fish. The clip 62 secures the strap 60 in place once the strap has engaged the securement member.

Figure 4:
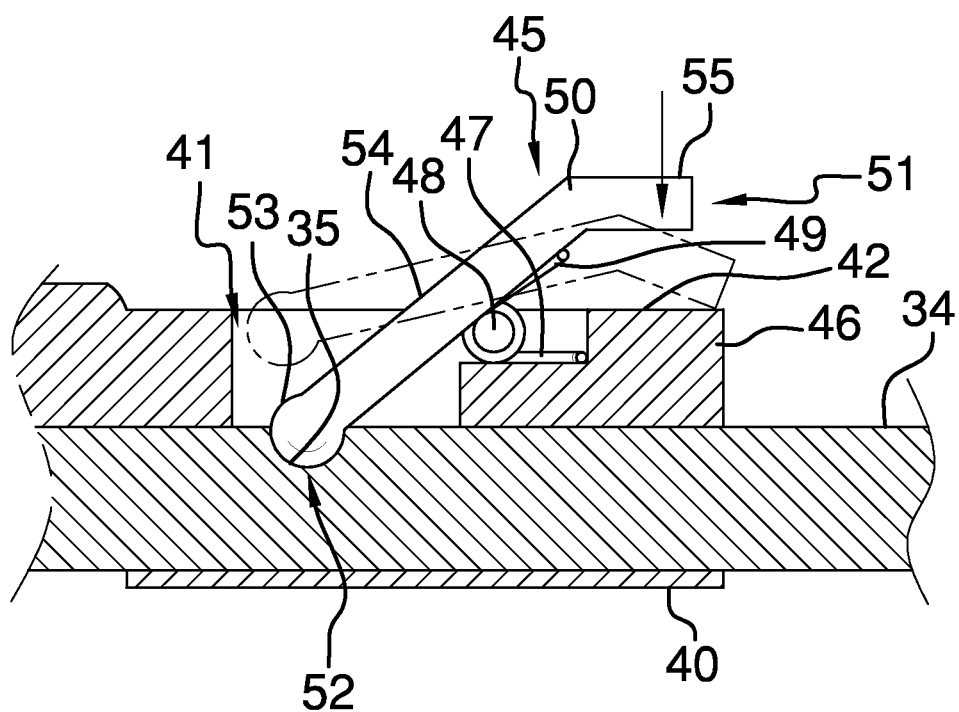
FIG. 4 is a partial cross sectional view taken along the line 4-4 of FIG. 1.
Figure 5:
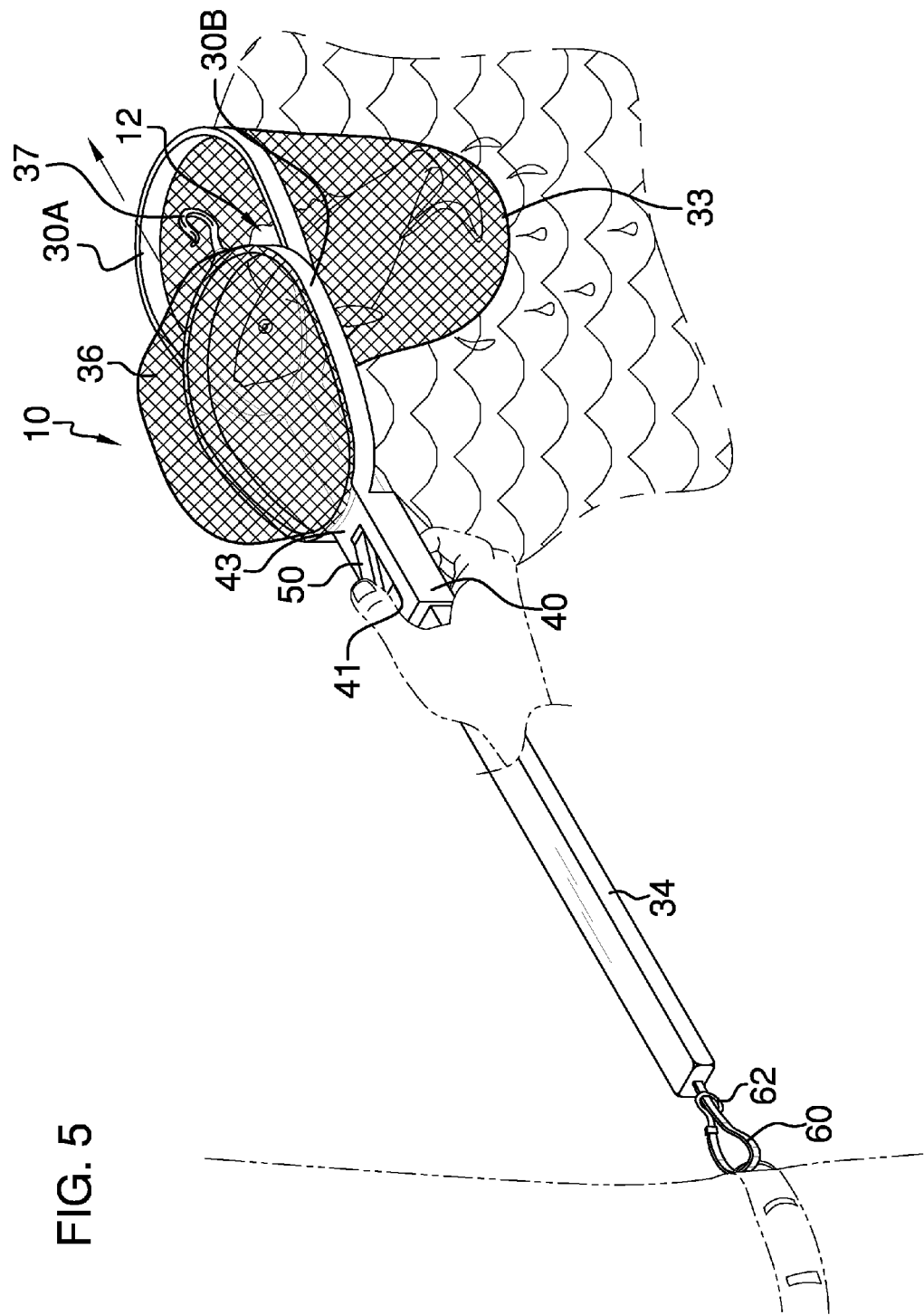
FIG. 5 is a perspective in use view with the small net and the second frame partially positioned above the large net and the first frame.
Figure 6:
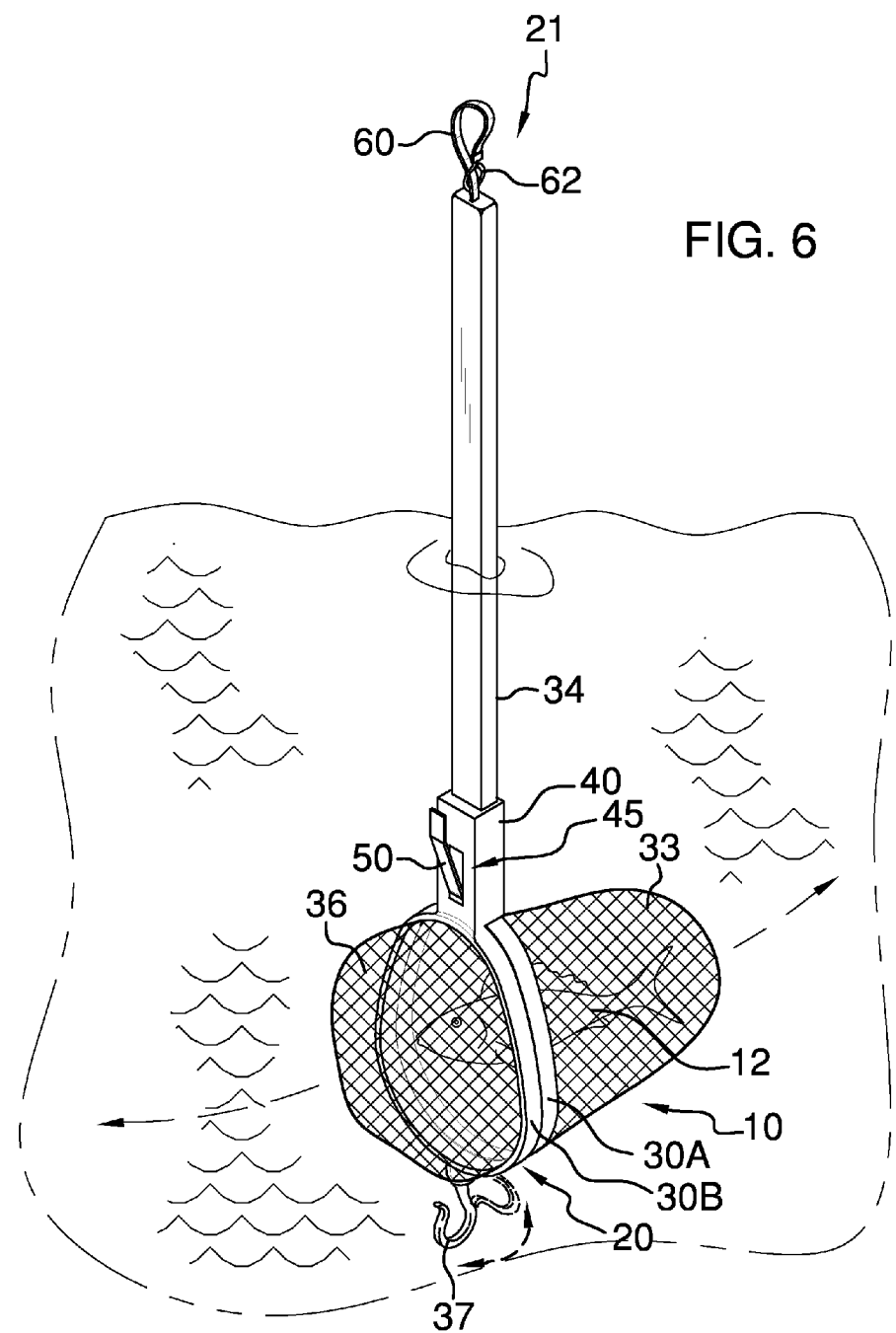
FIG. 6 is a perspective in use view illustrating the first frame with the large net and the second frame with the small net positioned parallel to a water surface for revival of a fish entrapped between the first and second frames and their respective large and small nets.

A lock mechanism 45 is disposed partially within the sleeve 40 opening 41 and slidably extends from the opening 41 to a position proximal the upper side 42 of the sleeve 40. The lock mechanism 45 partially comprises an L-shaped member 46. A lower step 47 of the L-shaped member is disposed medially within the L-shaped member 46 as shown in FIG. 4. A pivot 48 is disposed atop the lower step 47. A lever 50 is disposed within the opening 41. The lever 50 has an upper end 51 spaced apart from a lower end 52. A ball 53 is disposed on the lever 50 lower end 52. An angled step 55 is disposed on the lever 50 upper end 51. A shaft 54 connects the ball 53 to the angled step 55. The shaft 54 is connected to the pivot 48. A spring 49 is in contact with the lower step 47 and the shaft 54. The spring 49 applies a downward pressure upon the ball 53. The ball 53 selectively engages one of the semicircular detents 35 to position the sleeve 40 in a selected position along the handle 34. The selected position of the sleeve 40 and therefore the attached second frame 30B in any of a plurality of locations along the handle 34.

Figure 7:
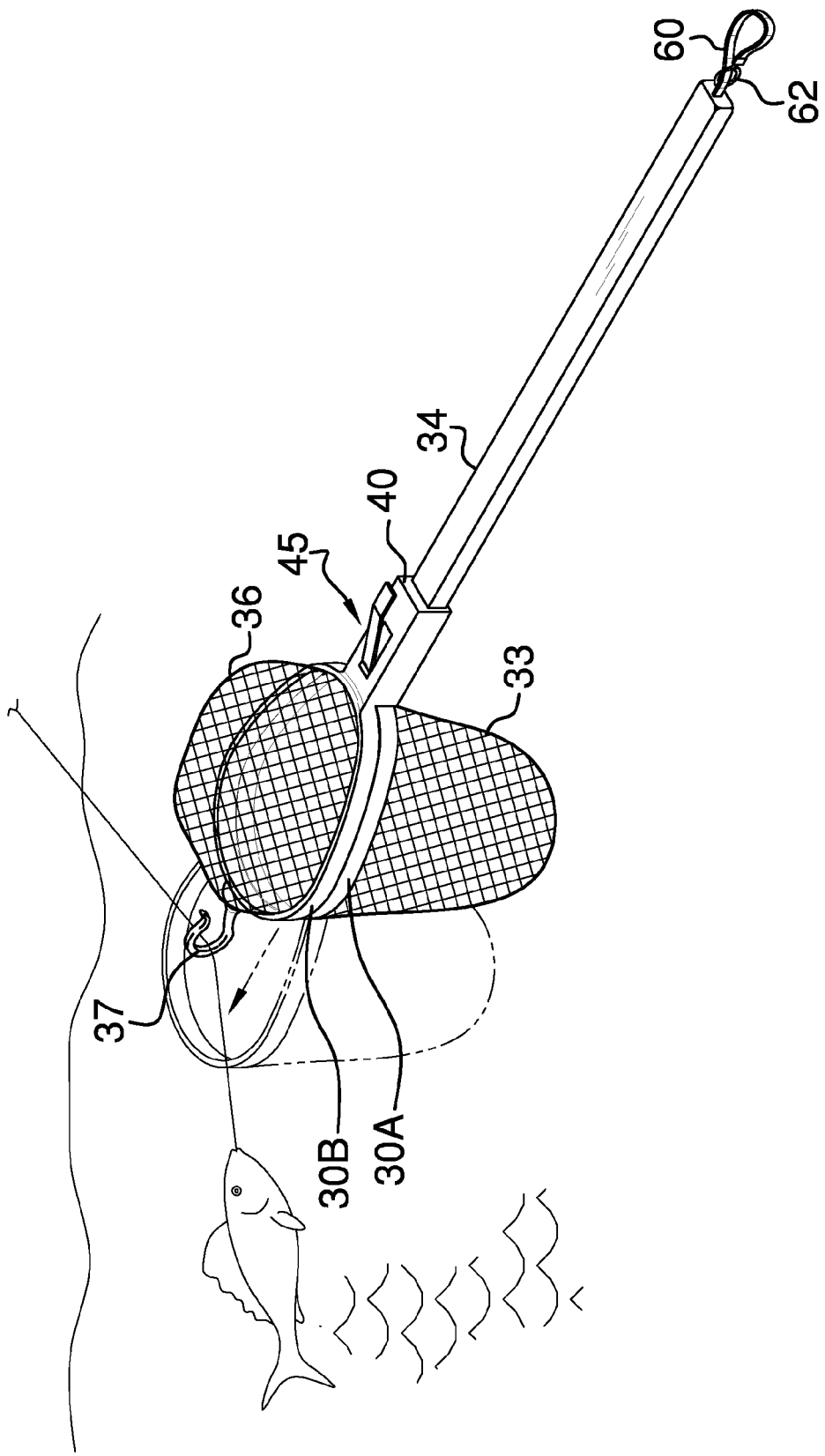
FIG. 7 is a perspective in use view illustrating a hook engaging a fishing line with a caught fish on the fishing line.
Figure 8:
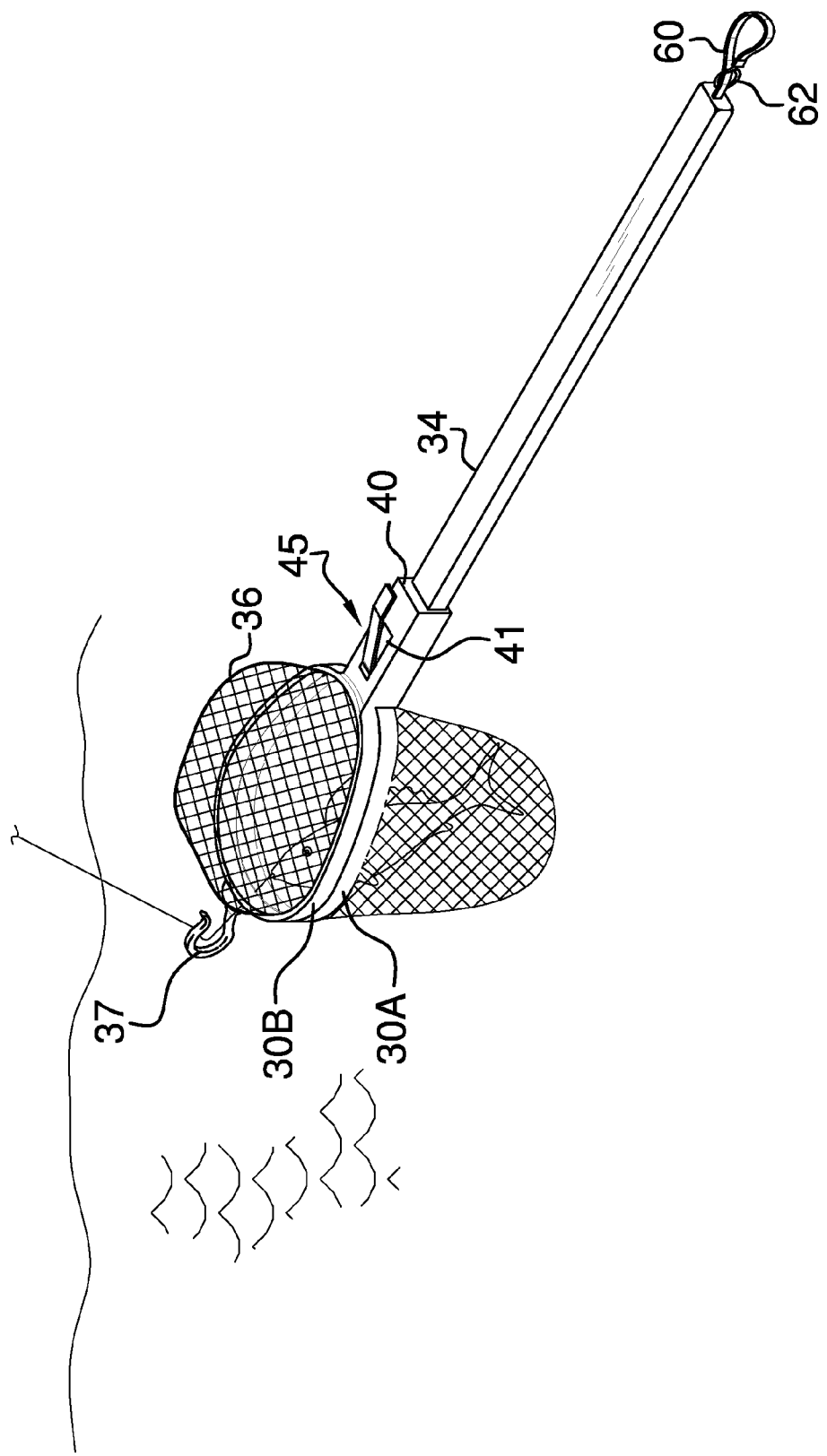
FIG. 8 is a perspective in use view illustrating the hook engaging a fishing line with a caught fish on the fishing line and captured between the first and second frames and their respective large and small nets.

A rigid second frame 30B identical to the first frame 30A is provided. The second frame 30B small portion 32 is disposed on a forward end 43 of the sleeve 40 in an inverted position with respect to the first frame 30A. The small net 36 is flexibly extended above the second frame 30B. A hook 37 is pivotally disposed on an apex 38 of the second frame 30B. The hook 37 pivots from a lowered position in which the hook extends forwardly from the apex 38 and away from the small net 36 to an upright position perpendicular to the second frame 30B. The hook 37 is also rotatable from a left position to a right position. The hook 37 is configured to engage a fishing line, as illustrated in FIG. 7, to pull a caught fish into the large net 33.

The sleeve 40 and therefore second frame 40B and small net 36 are positioned partially over the first frame 30A to reduce the size of the open area between the frames and nets.

The handle 34 is selectively positioned vertically upright in the water. The small net 36 and large net 33 thereby form a horizontally disposed trap to hold the fish 12 therein. In this manner, the fish 12 can be properly revived and ensured of survival prior to release, for example. Importantly, a user can then depress the lever 50 angled step 55 and elevate the sleeve 40 and therefore the second frame 30B and small net 36 to release the fish 12 without having to touch the fish 12.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the coverable fish net apparatus may be used.

What is claimed is:

1. A coverable fish net apparatus comprising, in combination:
   a first end spaced apart from a second end;
   a planar egg shaped first frame disposed at the first end, a large portion of the first frame disposed distally, a small portion disposed medially;
   a large net flexibly suspended downwardly from the first frame;
   a handle inflexibly extended from the first frame small portion to the second end;
   at least one semicircular detent centrally disposed on a top side of the handle;
   a sleeve slideably disposed around the handle;
   an opening centrally disposed within the sleeve from an upper side thereof to the top side of the handle;
   a strap disposed on the second end;
   a quick-release clip disposed on an outer end of the strap;
   a lock mechanism disposed partially within the sleeve opening and slideably extended from the opening to a position proximal the upper side of the sleeve, the lock mechanism comprising:
      an L-shaped member;
      a lower step of the L-shaped member, wherein the lower step is disposed medially within the L-shaped member;
      a pivot disposed atop the lower step;
      a lever disposed within the opening, the lever having an upper end spaced apart from a lower end;
      a ball disposed on the lever lower end;
      an angled step disposed on the lever upper end;
      a shaft connecting the ball to the angled step, the shaft connected to the pivot;
      a spring in contact with the lower step and the shaft, wherein activation of the spring applies a downward pressure upon the ball, wherein the ball selectively engages one of the semicircular detents, wherein the selective engagement of the ball and one of the semicircular detents positions the sleeve in a selected position along the handle;
   a second frame identical to the first frame, the second frame small portion disposed on a forward end of the sleeve in an inverted position with respect to the first frame;
   a small net flexibly extended above the second frame; and
   a hook pivotally disposed on an apex of the second frame, wherein the hook pivots from a lowered position extended forwardly from the apex and away from the small net to an upright position perpendicular to the second frame.

2. The apparatus of claim 1 wherein the hook is further rotatable from a left position to a right position.

3. The apparatus of claim 1 wherein each of the first frame and the second frame is rigid; and
   wherein the handle is rigid.

4. The apparatus of claim 2 wherein each of the first frame and the second frame is rigid; and
   wherein the handle is rigid.

* * * * *